United States Patent [19]

Curtis

[11] Patent Number: 5,199,577

[45] Date of Patent: Apr. 6, 1993

[54] FILE RACK

[75] Inventor: Steven G. Curtis, Buena Park, Calif.

[73] Assignee: Russ Bassett Company, Whittier, Calif.

[21] Appl. No.: 750,288

[22] Filed: Aug. 27, 1991

[51] Int. Cl.⁵ .............................................. A47F 7/00
[52] U.S. Cl. ........................................ 211/40; 211/41; 211/181
[58] Field of Search ................... 211/40, 41, 106, 181

[56] References Cited

U.S. PATENT DOCUMENTS

| | | | |
|---|---|---|---|
| 2,205,064 | 6/1940 | Irwin | 211/40 X |
| 2,222,831 | 11/1940 | Bitney | 211/106 X |
| 3,220,557 | 11/1965 | Brandes | 211/40 |
| 4,056,260 | 11/1977 | David | 211/41 X |
| 4,293,075 | 10/1981 | Veralvud | 211/40 |
| 5,054,626 | 10/1991 | Stempinski | 211/40 |

Primary Examiner—Robert W. Gibson, Jr.
Attorney, Agent, or Firm—George J. Netter

[57] ABSTRACT

A file rack (10) for objects (12) such as video cassettes, CD records, or the like, having two upstanding spaced apart posts (18, 20) forming a front side (14) and two further upstanding posts (22, 24) defining a rear side (16). Wire member dividers (26) are affixed to each of the four posts (18, 20, 22, 24) in spaced relation to each other forming storage bins 25 which slope downwardly from the front side to the rear side. Objects (12) are added to and removed from the bins from the rack front side (14).

4 Claims, 2 Drawing Sheets

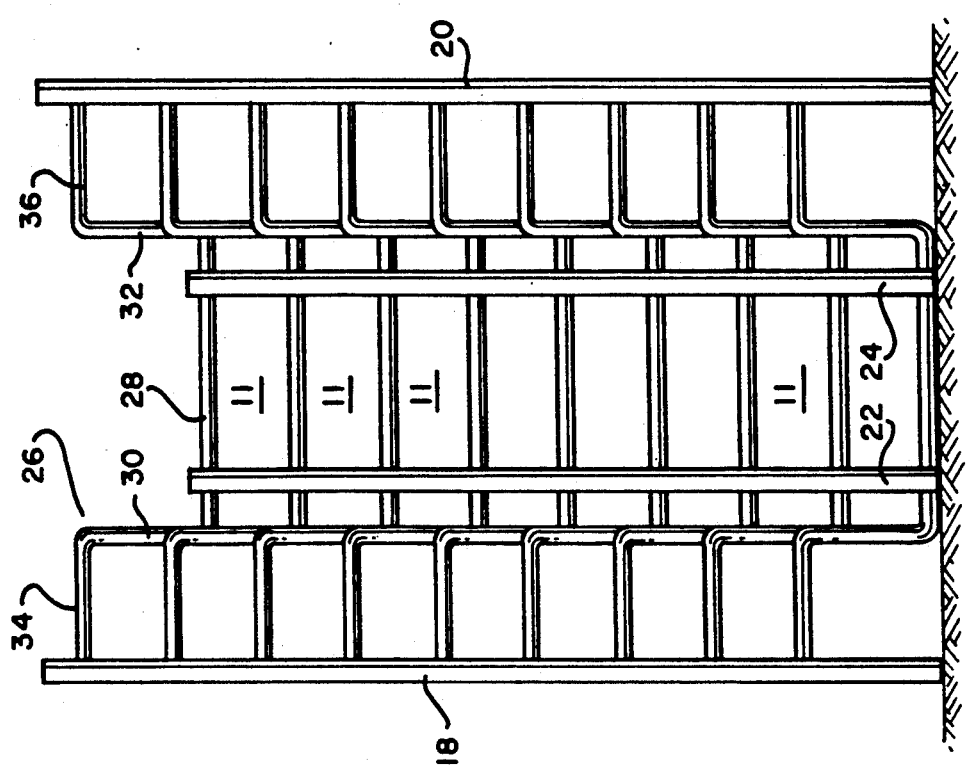
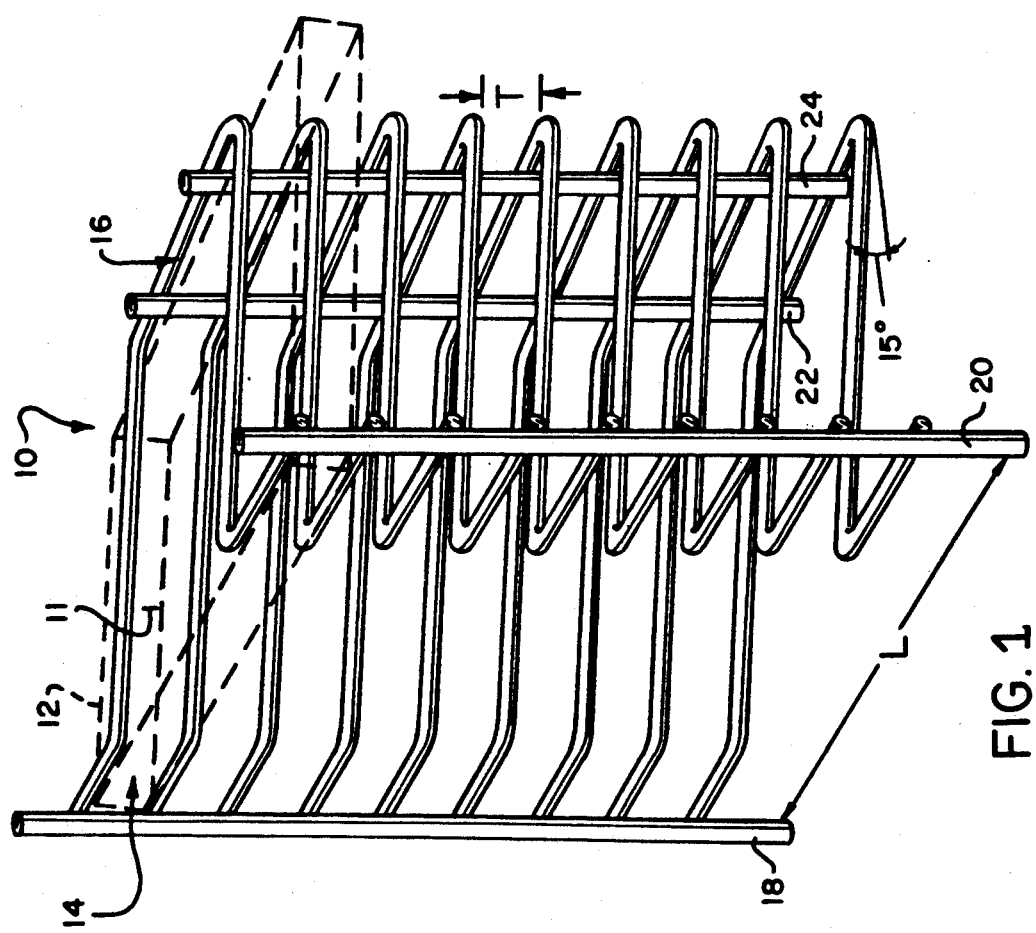

FILE RACK

BACKGROUND

Field of the Invention

The present invention relates generally to a file rack for accommodating a plurality of similarly shaped objects of generally parallelepiped construction.

SUMMARY OF THE INVENTION

It is a primary aim and object of this invention to provide a file rack for accommodating generally flat parallelepiped objects which are edge inserted and withdrawn from the rack.

The file rack of the present invention includes four upstanding posts which are substantially parallel to one another, two of the posts defining a front or entrance side via which objects are placed in the file or removed therefrom, and the other two posts are at the rear of the file and serve as a inner limit against which the objects to be stored therein abut. Bent wire members of identical construction are affixed to the upstanding posts forming respective supports for objects, which posts and bent wire members are so arranged that the members are substantially parallel to one another and canted to the same angular extent with respect to a base or surface upon which the posts are mounted. More particularly, it is preferable that the wire members form a plurality of planes canted downwardly from the front to the back of the rack. Each wire member is bent into a generally U-shape with the cross bar of the U being secured to the rear upstanding posts and the outer end portions of the side arms being flared outwardly with their ends secured to the front or entrance upstanding posts. The spacing between the entrance posts is slightly larger than the maximum length of an object to be stored and the spacing between the back two posts is substantially less than the length of the objects to be stored.

DESCRIPTION OF THE DRAWING

In the accompanying drawing:

FIG. 1 is a perspective view of the file rack of this invention;
FIG. 2 is a front elevation view.

DESCRIPTION OF A PREFERRED EMBODIMENT

Figure 3:
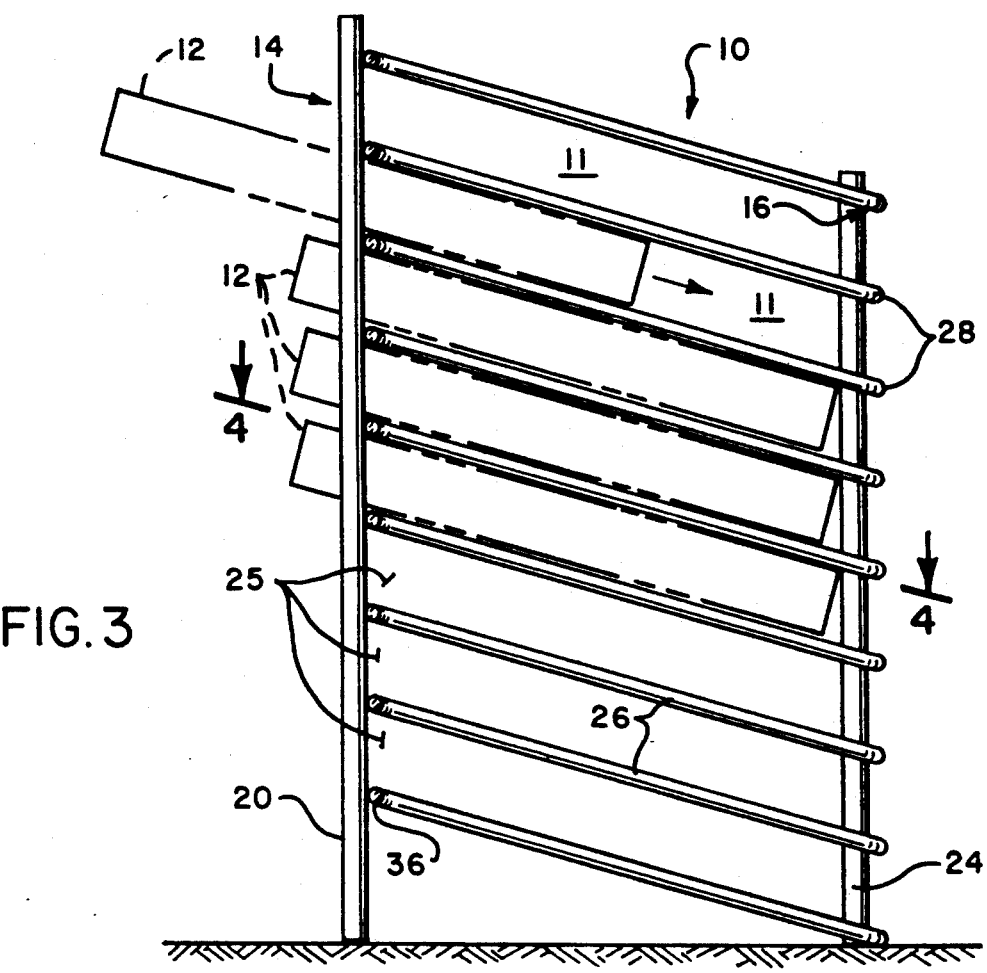
FIG. 3 is an end elevational view.

Turning now to the drawings, the file rack of the present invention enumerated generally as 10 consists generally of an upstanding rack having a plurality of vertically arranged storage bins 11, each of which is for receiving and storing a parallelepiped shaped object 12. The file rack 10, in a way that will be more particularly described, has a front side or entrance 14 via which the objects are inserted into and removed from the rack, and a rear side 16 serving as a limit stop for objects stored in the rack as a result of gravity causing the objects to move toward and against side 16.

The front side 14 from which objects are to be stored and withdrawn from the file rack is defined by first and second vertical upstanding supports 18 and 20 arranged parallel to one another and spaced apart an amount slightly larger than the length of an object to be stored. Although the posts 18 and 20 can be made of other materials, best results to date have been obtained when these posts are constructed of a metal wire such as steel, for example.

The rear of the file rack is defined by a further pair of upstanding posts 22 and 24 which are slightly shorter than the front posts 18 and 20 and disposed closer together than the front posts (FIG. 2). It is also important that the rear posts be parallel to the front posts and to each other, with the plane of the rear posts being generally parallel to the plane of the front posts.

The file rack storage bins or compartments 25 are vertically defined by spaced apart bent wire dividers 26 each of which are secured to the front and back upstanding posts forming a unitary construction. Each divider 26 is formed from a single length of metal wire in the overall general shape of a letter "U" including a cross bar 28, and two adjoining side arms 30 and 32 with each side arm ending in an outwardly flaring end portion 34 and 36, respectively. The two side arms are parallel and of equal length, and the flaring end portions also are of equal length, aligned and parallel to the crossbar.

The front posts 18 and 20 are respectively affixed to the outwardly facing sides of the flaring end portions 34 and 36 immediately adjacent the ends thereof. Similarly, the two rear or back posts 22 and 24 are affixed to the inner surface of the crossbar of each divider so that the thickness T of each bin or compartment is the same, uniform throughout, and only slightly greater than the thickness of an object to be stored.

Figure 4:
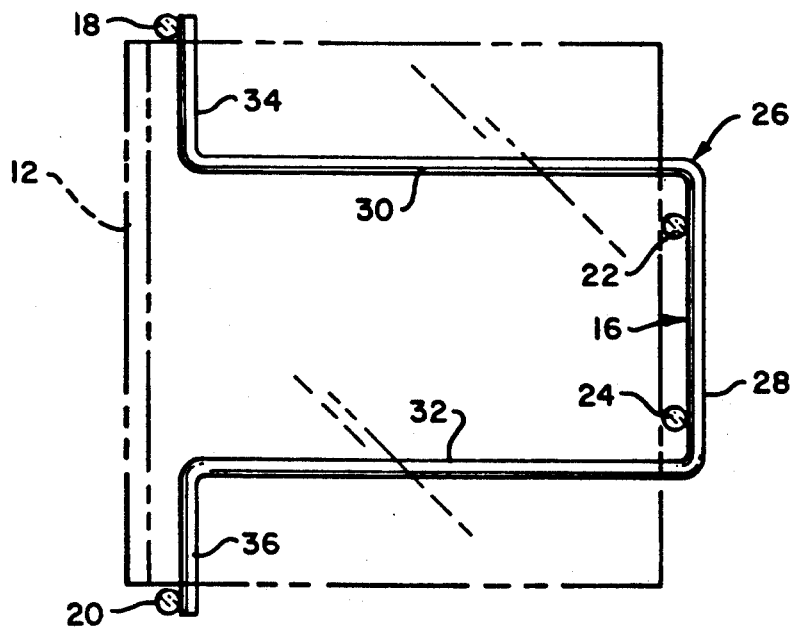
FIG. 4 is a top plan view.

It is important to note that the rear posts 22 and 24 and the crossbar 28 as well, are separated an amount greater than one-half the object length L, but not so great that an inner corner of an object can be caught on one of the posts when an object is being inserted into a bin, for example. This insures stable retention of an object within a bin so that the object will not tend to rock about within the bin (FIG. 4).

A further requirement is that each divider is secured to the posts in such manner that when the front and rear posts rest on a flat horizontal surface 34, the bins slope downwardly front to back preferably about 15 degrees, but not more than about 30 degrees for a reason to be described (FIG. 3).

In use, the four posts of the file rack will typically rest upon a flat, generally horizontal surface 34 such as a table, desk, cabinet shelf or bottom, for example, with the front or entrance side exposed (or otherwise selectively available). An object 12 to be stored is merely inserted by holding a top edge portion and inserting it bottom side first into a bin 11. The object is aided by gravity in sliding along the bin to end up with the object bottom stably resting against the rear posts 22 and 24. To remove a stored object, the top edge portion is gripped by the fingers and pulled. Alternatively, the two opposite top end edges may be gripped and the object removed.

Since the bins are arranged at a relatively small angle with respect to horizontal, the objects are relatively easy to remove from storage mode as compared to storage systems where the object top edges are maintained vertically upward.

Although the dividers and posts may be affixed together into a number of different known ways, they are preferably welded.

Although the present invention is described in connection with a preferred embodiment, it is to be understood that those skilled in the appertaining art may contemplate modifications that come within the spirit of the invention and the scope of the appended claims.

What is claimed is:

1. A file rack for storage of objects in vertical spaced apart relation with an edge portion of each object being accessible for finger gripping to remove the stored object, comprising:

first and second upstanding spaced apart posts defining an entrance side for the file rack;

third and fourth upstanding posts spaced apart an amount less than said first and second posts defining the back side for the file rack;

a plurality of identical bent wire dividers affixed to the upstanding posts in a parallel equally spaced relation, said dividers being substantially planar and sloping uniformly downwardly from the first and second posts to the third and fourth posts; and each divider is generally U-shaped with a crossbar approximately the same length as the spacing of the third and fourth posts, two equal length side arms, and outer end portions of the side arms being flared opposite to one another, said first and second posts being secured to the flared end portions and said third and fourth posts being secured to the divider crossbars.

2. A file rack as in claim 1, in which the dividers are affixed to the upstanding posts by welding.

3. A file rack as in claim 1, in which the object to be stored has a length approximately equal to the spacing of the first and second posts, and the spacing of the third and fourth posts against which the bottom of a stored object rests is at least one half the object length.

4. A file rack as in claim 1, in which the wire is constructed of steel.

* * * * *